Figure 1:
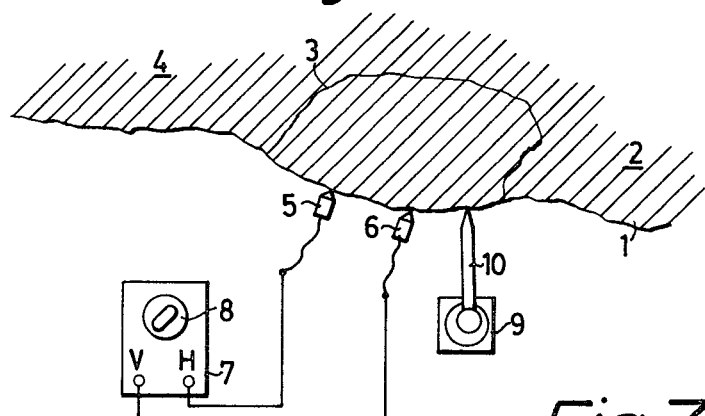

United States Patent [19]

Tegholm

[11] 3,804,205

[45] Apr. 16, 1974

[54] DEVICE FOR INVESTIGATING PROPERTIES OF ROCK TO ESTABLISH THE PRESENCE OF LOOSE BLOCKS ADJACENT TO THE SURFACE THEREOF

[75] Inventor: Ruben Valdemar Tegholm, Johanneshov, Sweden

[73] Assignee: Atlas Copco Aktiebolag, Nacka, Sweden

[22] Filed: Feb. 1, 1971

[21] Appl. No.: 111,599

[30] Foreign Application Priority Data

Feb. 5, 1970   Sweden.............................. 1489/70

[52] U.S. Cl. ............................................ 181/.5 NP
[51] Int. Cl. ...................... G01n 19/08, G01n 29/04
[58] Field of Search ......... 181/.5 NP, .5 R; 73/67.2, 73/69

[56] References Cited
UNITED STATES PATENTS
2,549,076   4/1951   Gallagher et al. ............... 181/.5 NP Primary Examiner—Benjamin A. Borchelt
Assistant Examiner—J. V. Doramus
Attorney, Agent, or Firm—Flynn & Frishauf

[57] ABSTRACT

When scaling rock, in particular in connection with blasting rock chambers and rock tunnels, the presence of loose blocks adjacent the surface of the rock is detected by bringing at least two electro-accoustic transducers into contact of the wall of the rock under examination at a distance from each other and comparing phase or amplitude or, as the case may be, both these properties of voltages generated by the electro-accoustic transducers in dependence of mechanical oscillations present in the rock. The presence of a block which is separated from the adjacent mass of rock is detected by evaluating amplitude or phase, or both, of signals generated by the or to each two, respectively, transducers when brought into contact with the rock surface under investigation. When the transducers are in contact with a loose block, the ratio of or difference between signals generated by the two transducers differ from those obtained when the same transducers are brought into contact with the surface of solid rock, thus making observation or indication of the presence of a loose block possible.

12 Claims, 3 Drawing Figures

DEVICE FOR INVESTIGATING PROPERTIES OF ROCK TO ESTABLISH THE PRESENCE OF LOOSE BLOCKS ADJACENT TO THE SURFACE THEREOF

When scaling rock in connection with blasting rock chambers and tunnels it has been common practice only to use purely subjective methods for detecting the presence of loose blocks, that is usually one has listened to the sound created by hitting the rock surface with a hammer or the like. The sound thus obtained has then been considered as an "indication" whether the rock is loose or steady.

Methods are proposed in which reflections originating from the boundary surfaces of a loose block obtained after impacting the block are recorded. Such methods require a comparatively elaborate and complicated electronic equipment. Further and in particular, problems arise when the blocks are large and the available mechanical energy too small with respect to the size of the block. In addition, apparatuses of this kind are very sensitive as to level of interference of seismic character present in the rock body and generated by, for instance, drilling, blasting or other mechanical treatment of the rock. Even vehicular traffic may give rise to interferences making measurement difficult.

The invention is in respect of a method and has for its purpose to provide a device for checking rock chamber roofs by which difficulties caused by external seismic interferences are substantially eliminated. Instead, such external interferences may be used as or contribute as energy source during the measurements.

SUMMARY OF THE INVENTION

For this purpose the measurement is made in accordance with a method the characteristics of which appear from the appended claims in respect of a method. An apparatus according to the invention for executing the method has characteristics appearing from the appended claims in respect of an apparatus.

Thus, the method according to the invention is executed by applying at least two electro-accoustic transducers at a distance from each other onto the wall of the rock to be investigated, and by comparing phase and/or amplitude of voltages generated by said electro-accoustic transducer by mechanical oscillations present in the rock.

In accordance therewith an apparatus for checking property of rock to investigate presence of loose blocks adjacent the surface thereof comprises at least two electro-accoustic transducers and measuring instrument for measuring at least one of the properties difference in phase and difference in amplitude of signals from the two electro-accoustic transducers or each couple of two of the electro-accoustic transducers.

The invention is based on the fact that, when measuring vibrations in steady rock at measuring points which are located comparatively adjacent each other, that is, as compared with the wave length in the rock of the measured vibrations, oscillations are generated, which have equal amplitudes and are not substantially displaced in phase are generated when the rock is solid, while when measuring on a block which is attached to the solid rock more or less loosely, the signals will show different amplitude or phase displacement or both. In consequence therewith, the method according to the invention is executed by applying at least two electro-accoustic transducers to the surface of the rock to be investigated at two locations at some distance from each other, the phase and amplitude of the voltages generated by the electro-accoustic transducers being compared.

Figure 2:
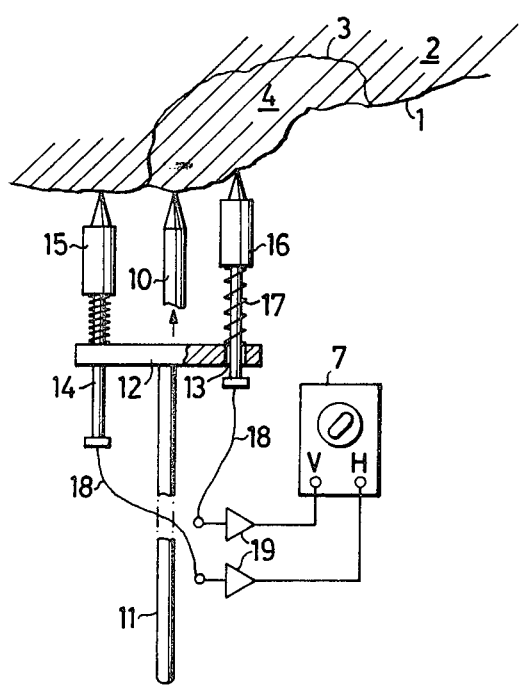

The invention will be described in more detail below in conjunction with the accompanying drawing on which, FIG. 1 diagrammatically shows a basic circuit to explain the invention, FIG. 2 diagrammatically illustrates an embodiment of the device according to the invention, and FIG. 3 an embodiment of a device for generating signals used when measuring with the apparatus.

The general principle of the invention is illustrated by FIG. 1, diagrammatically showing a rock wall 1 of a solid rock 2 in which a block 4, more or less separated from the solid rock by a fissure 3, is present. As shown in FIG. 1, the measuring equipment comprises two electro-accoustic transducers 5 and 6, the electric outputs of which are connected to the measuring instrument equipment, here shown in form of an oscilloscope 7. An oscilloscope is well suited for visualizing the result obtained by the measurement, as the oscillation obtained from one of the electro-accoustic transducers may be applied to the vertical deflection system of the oscilloscope and the oscillation obtained from the second electro-accoustic transducer to the horizontal deflection system. For similar amplitudes of and no phase displacement between the oscillations obtained from the two electro-accoustic transducers 5 and 6, a straight line sloping 45° is obtained on the oscilloscope, presupposing, of course, that the electro-accoustic transducers and the transfer circuits for the electric oscillations from the transducers are such that a specific intensity of a vibration in the rock leads to the same amplitude of the measured oscillations. Obviously, such conditions may be adjusted by, amongst others, adjusting the transfer circuits between the electro-accoustic transducers and the measuring system.

To avoid the necessity of presence of oscillations of seismic origin in the rock — which, however, as a general principle, can as well be utilized for a measurement - a device according to the invention preferably comprises a device for generating oscillations in the rock to be measured, to be applied to the rock adjacent the electro-accoustic transducers used for the measurement.

In a preferred embodiment, such a generator of oscillations comprises a motor 9 having one or more weights arranged eccentrically on a shaft driven by the motor. Advantageously the motor is equipped with means for varying the speed thereof, so that mechanical vibrations of variable frequency can be "injected" into the rock by aid of a rod 10. The possibility of varying the frequency of oscillations injected into the rock is of specific importance when injecting oscillations in a loose block, this for reason that the block, when caused to vibrate, will vibrate in such a manner that the direction of movement during the vibrations is not perpendicular to the direction of injection. In addition to a longitudinal movement, the block will a rotational movement as well.

When the frequency of the injected oscillations, that is, the rotational speed of the motor, is varied, resonance oscillations may occur, which can give a lead when evaluating the measurement. Such resonance oscillations give rise to stronger oscillations of the block and cause different phase shift in the oscillations for different measuring points on the block.

The oscillations injected into the rock are not necessarily sinusoidal, but can be of arbitrary shape, itterated blows, for instance. Further, the oscillations are not necessarily applied to a block to make possible to attain a result aimed at by the measurement, that is, to get an indication whether it is a question about a loose block. Even when the oscillations arrive from the surrounding solid rock mass 1 and independently of the fact whether they are generated by the oscillation generator or by impact against the rock, or simply originate from external interferences of seismic origin, the oscillations will give rise to measuring signals revealing the presence of a loose block when any one of the measured oscillations originates from an electro-accoustic transducer applied to the block.

As a general principle, the electro-accoustic transducers used as generators of the measured signals, may be located in accordance with a very arbitrary arrangement, such as for instance one transducer on each side of a generator of vibrations, should the apparatus comprise such generator for the measurement.

When using more than two transducers for the measurement, it is expedient to use one oscilloscope for a combination of two transducers, so as for instance two or three oscilloscopes for measurement of difference in phase and amplitude of signals obtained from three transducers.

The image obtained on an oscilloscope during measurement will have a characteristic shape in dependence of phase and amplitude of the received voltages. For different amplitudes, lissajous that the respective transducers are either each both applied to a loose block or one of them to solid rock and the other one to a loose block, the slope of the line constituting the oscillogram will deviate from 45°. Further, a phase shift may be obtained by continuously changing the frequency of the generated oscillation injected into the rock, which will be indicated by the oscilloscope by the sloping line changing into a more or less sloping and more or less regular ellipse. When injecting irregular vibrations, by impact for instance, other images, such as lissajois figures, may be obtained, the shapes of which are dependent upon amplitude, frequency, and phase shift.

As appearing from the above, the device need not be complicated and can therefore easily be constructed so as to be sturdy and reliable. An important advantage obtained by the invention is that the measuring result is entirely independent of external seismic interference. Obviously, the apparatus can be constructed in different ways. Amongst others, a vibration generator suitable for the purpose may consist of practically any kind of transducer, electro-dynamic or piezo-electric for instance.

The indicating instrument by which the measured signals are evaluated may be other than a cathode ray oscillograph as described, such as an indicating instrument, an instrument recording received signals in connection with variable frequency of the oscillation generator, etc.

To facilitate the use of an apparatus according to the invention in practice, the electro-accoustic transducers for generating the measured oscillations are, in a preferred embodiment and as illustrated in FIG. 2, mounted on a common support means 11 comprising a member 12 having bearings 13 for sliding rods 14 of each one transducer 15 and 16, the rods being displaceable parallel to each other in the bearings. At rest, the transducers are held in an outer position from the member 12 by respective springs 17 and can thus be applied to measuring points in such a manner that the two transducers, or all transducers if more than two are present, simultaneously contact the rock surface.

The transducers are, in couples of two if more than two are present, connected to the instrument equipment for the phase and amplitude comparison, in FIG. 2 as shown as an oscilloscope 7, via conductors 8 and amplifiers 19 which obviously preferably comprises means for zero calibration of the instrument equipment. In a preferred embodiment such amplifiers have an automatic gain control which, to give adequate measuring results for signals of different strength should be dimensioned accordingly. That is, the gain control shall, as a general principle, be such that the two are actuated to the same degree. Further, the amplifiers are preferably combined with high and low pass filters to make possible a selection of oscillations suitable for the measurement.

However, it is to be mentioned that the instrumental equipment need not necessarily comprise such comparatively complicated measuring instruments a an oscilloscope or phase indicating or amplitude indicating instruments. A desired indication is obtainable as well with an instrument comprising circuit components actuated by phase and/or amplitude difference of received signals and causing an indication of exceeding a predetermined and preferably variable threshold value, for instance by means of an indication lamp.

The device with which vibrations are to be injected into the rock may, if present, as well be arranged on the means supporting the transducers, such an arrangement being expedient in particular when an electro-mechanical transducer of some kind is the generator of the vibrations. Such an electro-mechanical transducer may easily be constructed with such dimensions that a very handy apparatus is obtained.

Figure 3:
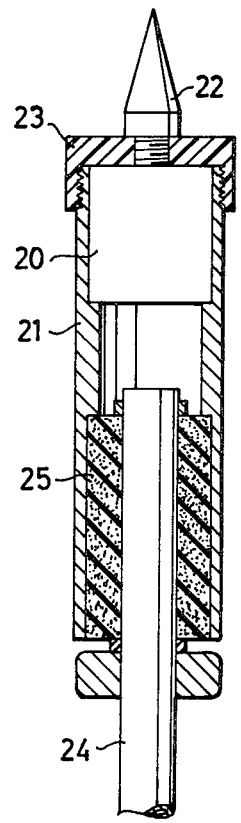

A transducer unit suitable for the purposes of the invention is illustrated, in longitudinal section, in FIG. 3. The transducer unit comprises a capsule 20 containing the electro-accoustic transducer proper, which may be of piezo-electric or electro-dynamic type or otherwise constructed as known to the art, the capsule being mounted at one end of a tubular cover 21 and the sensing means of which actuating the transducer being a metal pin 22 extending through a protecting cover 23 for the capsule. The cover 21 is mounted on a rod 24 (being, as the case may be, the rod 14 shown in FIG. 2) by means of a sleeve 25 of soft elastic material, sponge-rubber for instance, protected by and attached to the rod by means of a nut 26, the nut not being in immediate contact with the cover 21. Conductors, not shown, for transferring signals from the transducer suitably extend through a channel of the rod 24 to the measuring equipment.

While this invention has been described with respect to specific examples thereof, it should not be construed as being limited thereto. Various modifications and substitutions will be obvious to everyone skilled in the art and can be made without departing from the scope of this invention.

What is claimed is:

1. Apparatus for determining the presence of a loose block adjacent the surface of a rock comprising:
   at least two electro-acoustic transducers (15, 16) having respective sensing members (22);
   a support means (11, 12) carrying said at least two electro-acoustic transducers (15, 16) with said electro-acoustic transducers being spaced from each other and in a position for the sensing members (22) of said electro-acoustic transducers (15, 16) to be simultaneously brought into contact with the rock surface at respective different locations for simultaneously generating signals corresponding to mechanical oscillations or vibrations in the rock at said different locations; and
   measuring means (7) coupled to said electro-acoustic transducers (15, 16) for simultaneously comparing the signals simultaneously generated by at least a first and second of said electro-acoustic transducers to determine the presence of a loose block.

2. Apparatus according to claim 1 wherein said measuring means (7) simultaneously compares the phases of the signals generated by said transducers, a loose block being detected when said phases are substantially different.

3. Apparatus according to claim 1 wherein said measuring means (7) simultaneously compares the amplitudes of the signals generated by said transducers, a loose block being detected when said amplitudes are substantially different.

4. Apparatus according to claim 3 wherein said measuring means (7) further compares the phases of said signals.

5. Apparatus according to claim 1 wherein said support means (11, 12) carries said electro-acoustic transducers (15, 16) with their respective sensing members (22) being directed substantially in the same direction.

6. Apparatus according to claim 5 including two electro-acoustic transducers, and comprising means for allowing said two electro-acoustic transducers to be displaced relative to said support means in said direction; and spring means biasing said displaceable transducers in said direction.

7. Apparatus according to claim 6 comprising a means (10) carried by said support means (11, 12) for injecting mechanical oscillations or vibrations into the rock, said means (10) being carried in a position to be brought into contact with the rock surface concurrently with the contacting of said electro-acoustic transducers with said same rock surface.

8. Apparatus according to claim 7 wherein said means for injecting mechanical oscillations or vibrations into the rock is fixedly connected to said support means.

9. Apparatus according to claim 5 comprising means for allowing at least one of said electro-acoustic transducers to be displaced relative to said support means in said direction; and spring means biasing said displaceable transducer in said direction.

10. Apparatus according to claim 9 comprising a means (10) carried by said support means (11, 12) for injecting mechanical oscillations or vibrations into the rock, said means (10) being carried in a position to be brought into contact with the rock surface concurrently with the contacting of said electro-acoustic transducers with said same rock surface.

11. Apparatus according to claim 1 comprising a means (10) carried by said support means (11, 12) for injecting mechanical oscillations or vibrations into the rock, said means (10) being carried in a position to be brought into contact with the rock surface concurrently with the contacting of said electro-acoustic transducers with said same rock surface.

12. Apparatus according to claim 1 comprising means for injecting mechanical oscillations or vibrations into the rock.

* * * * *